May 29, 1962     E. W. MANTEUFFEL     3,037,160
MAGNETICALLY REGULATED POWER SUPPLY
Filed Oct. 31, 1955     3 Sheets-Sheet 1

INVENTOR:
ERICH W. MANTEUFFEL,
BY George V Eltgroth
HIS ATTORNEY.

May 29, 1962    E. W. MANTEUFFEL    3,037,160
MAGNETICALLY REGULATED POWER SUPPLY
Filed Oct. 31, 1955    3 Sheets-Sheet 2

INVENTOR:
ERICH W. MANTEUFFEL,
BY
HIS ATTORNEY.

INVENTOR:
ERICH W. MANTEUFFEL,
BY George V Eltgroth
HIS ATTORNEY.

United States Patent Office 3,037,160
Patented May 29, 1962

3,037,160
MAGNETICALLY REGULATED POWER SUPPLY
Erich W. Manteuffel, Ithaca, N.Y., assignor to General Electric Company, a corporation of New York
Filed Oct. 31, 1955, Ser. No. 543,868
17 Claims. (Cl. 323—56)

This invention relates to magnetically regulated power supplies and more particularly to power supplies of this character wherein a controlled alternating voltage is added to a relatively fixed alternating voltage to provide an accurately controlled resultant output voltage wherein the controlled alternating voltage is furnished from a D.-C. controlled ferro-resonant source.

Known magnetic amplifier circuits have beside their many advantages several inherent disadvantages when used in connection with power supplies. Their transfer characteristics (output current or voltage versus control current) are considerably influenced by changes in supply voltage and load. The wave shape of their output current varies with control current similarly to the current of a thyratron so that the sudden current rise at the instant of firing has undesirable effects upon the wave shape of the A.-C. supply voltage. In addition, filtering is made more difficult in cases where a smooth direct voltage output is required. Also, magnetic amplifiers are basically controlled gates for currents, rendering them unsuitable for use with a fixed or variable A.-C. voltage source for boosting or balancing purposes.

Magnetic amplifiers of this character are presently used for self-regulated D.-C. power supplies by placing a bridge rectifier and cooperating filter within the amplifier's load circuit and controlling the amplifier through a preamplifier. Changes in output voltage due to variataions of load, supply voltage, frequency and temperature must be compensated for by comparing the output voltage of the power supply against a reference voltage within the preamplifier. Consequently, the operating point on the characteristic of the magnetic amplifier must be shifted over a considerable range which changes its mode of operation, wave shape and content of harmonics. Under these conditions, the magnetic amplifier normally has to be designed for approximately 150% of the required rated output power in order for it to operate within a linear portion of its characteristic and to maintain a sufficient range for the necessary regulation. This type of magnetic amplifier cannot be connected in series with an unregulated portion of the supply voltage in order to reduce the required regulated output power. A magnetically controlled independent A.-C. voltage source which could be connected in series to an unregulated voltage would be deemed extremely desirable since such a source could be designed for only the regulated portion of the output power. A source of this type would be less dependent on supply voltage variations, and its wave shape would be subjected to only negligible changes.

It is an object of this invention to overcome the aforesaid shortcomings of prior art power supplies.

More specifically, it is an object of this invention to provide a new magnetically controlled independent A.-C. voltage source which is adaptable to be connected in series with an unregulated voltage.

A further object of this invention is to provide a new and improved magnetic power supply in which a magnetically controlled alternating voltage is added to a relatively fixed alternating voltage to yield an accurately controlled output voltage.

Another object of this invention is to provide a magnetically controlled independent A.-C. voltage source suitable for connection to an unregulated voltage whose output voltage is less dependent on supply voltage variations, and its wave shape being subjected to only negligible changes.

A further object of this invention is to provide a new magnetic amplifier for use in a magnetic power supply which is essentially a magnetically controlled voltage source, the voltage of which is little influenced by load changes.

Another object of this invention is to provide a new and novel magnetic power supply which provides high reliability, high accuracy, low ripple in output voltage, high efficiency and power factor, yet remains within reasonable limits as to size and weight.

These and other advantages of this invention will be more clearly understood from the following description taken in connection with the accompanying drawings, and its scope will be apparent from the appended claims.

In the drawings.

In the specification, for purposes of simplicity, like elements will be designated with like reference characters.

Figure 1:
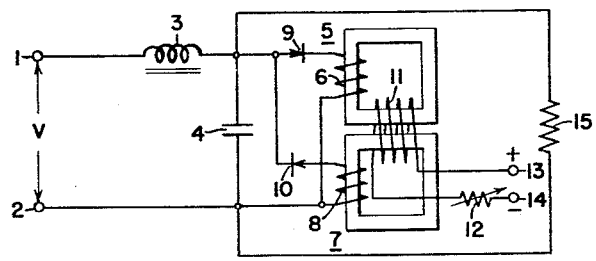
FIGURE 1 shows a schematic diagram of the new and improved magnetic amplifier which is utilized in this invention to provide a magnetically controlled alternating voltage.

FIGURE 1 is one embodiment of a magnetic amplifier illustrating the invention. It consists of a pair of saturable reactors 5 and 7, having A.-C. windings 6 and 8, respectively, and a common control winding 11. Control winding 11 is connected to terminal 13 and through a variable resistance 12 to terminal 14. A linear choke coil 3 and a capacitance 4 are serially connected across input terminals 1 and 2 to which an alternating voltage V is applied to the magnetic amplifier. Winding 6 of saturable reactor 5 has one terminal connected through a rectifying device 9 to one pole of capacitor 4 and the other terminal connected to the other pole of capacitor 4. Winding 8 of saturable reactor 7 has one terminal connected through a rectifying device 10 to one pole of capacitor 4 and the other terminal connected to the other pole of capacitor 4. A load device here represented by resistance 15 is also connected across capacitance 4.

Considering the operation of the circuit of FIGURE 1, with no control current applied to terminals 13 and 14 of the control winding 11 of saturable reactors 5 and 7, the cores of saturable reactors 5 and 7 remain in a state of saturation. Consequently, only a small voltage appears across the terminals of capacitance 4 to which load 15 is connected. The magnitude of this voltage depends mainly on the saturated inductance of the cores, the ohmic resistances of the rectifiers, and the ohmic resistances of windings 6 and 8. However, if a control current is applied to terminals 13 and 14, the magnitude of which may be adjusted by variable resistance 12, a proportional amount of flux change is allowed within the cores of saturable reactors 5 and 7. The voltage across capacitor 4 is now proportional to the controlled swing of flux in reactors 5 and 7. On a positive half-cycle of the voltage across the capacitor 4, rectifier 9 conducts which builds up the flux of saturable reactor 5. When the core of saturable reactor 5 saturates, a very rapid oscillatory discharge of capacitor 4 occurs through the rectifier 9 and winding 6 of saturable reactor 5 due to the fact that saturable reactor 5 acts as though it were an air core winding when fully saturated. After one half-cycle of this oscillatory discharge, the voltage across the capacitor 4 has reversed its polarity. During the succeeding negative half-cycle of voltage V, conduction takes place through winding 8 of saturable reactor 7 and rectifier 10. During the build up of flux in saturable reactor 7, and since no conduction is taking place through saturable reactor 5 due to the opposition rendered by rectifier 9, the flux of saturable reactor 5 is reset by the control current in control winding 11. When the core of saturable reactor 7 becomes saturated, capacitor 4 discharges through winding 8 of saturable reactor 7 and rectifier 10, causing a current peak through these elements and an almost instantaneous reversal in voltage on rectifier 9. This cycle repeats and after each half-cycle of the supply frequency, a rapid discharge of capacitor 4 takes place, causing a current peak through either saturable reactors 5 or 7 and rectifiers 9 or 10, respectively. The output voltage across capacitor 4 appears nearly rectangular in form which is modified somewhat by the load 15 and the sinusoidal supply voltage. Since the amount of flux swing within saturable reactors 5 and 7 is the major determining factor for the output voltage, this voltage remains insensitive to changes in input voltage across terminals 1 and 2. Possible influences of changing rectifier leakage on the output voltage is greatly reduced by this magnetic amplifier because the reverse voltage which occurs on one or the other rectifiers 9 or 10 during alternate half-cycles only occurs during the very short discharge time of capacitor 4.

This new type of magnetic amplifier as shown in FIGURE 1 differs from known types mainly in the fact that is essentially a magnetically controlled voltage source. This controlled voltage is little influenced by load changes as is the case with known devices since the load is not connected serially in the circuit with the input source and the rectifying and saturable reactor elements. The circuitry of this amplifier is not limited to the so-called doubler connection, but may be based on the center-tap or external feedback circuits.

Figure 2:
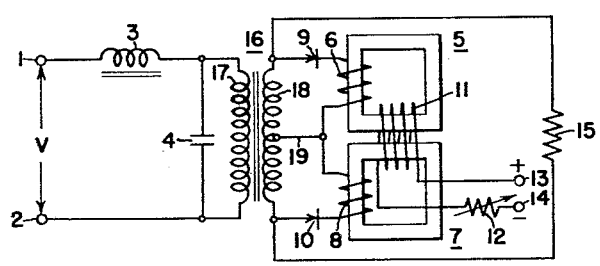
FIGURE 2 is a schematic diagram of a second embodiment of this new and improved magnetic amplifier.

FIGURE 2 shows saturable reactors 5 and 7 connected in a configuration resembling the center-tap, self-saturated magnetic amplifier. In this circuit, a transformer 16 having primary winding 17 and secondary winding 18 with a center-tap 19 is provided to make a center-tap connection available. Primary winding 17 of transformer 16 is connected across capacitance 4. Two branch circuits which include serially connected rectifier 9 and saturable reactor 5 and serially connected rectifier 10 and saturable reactor 7, respectively, each having one rectifier terminal connected to an opposite end terminal of secondary winding 18 and each having the other terminal connected to the center-tap 19. A load 15 is connected across the end terminals of secondary winding 18. On one-half cycle of input voltage wave, with control current being applied to terminals 13 and 14 of control winding 11, the branch circuit including rectifier 9 and saturable reactor 5 conducts while the branch circuit including rectifier 10 and saturable reactor 7 is non-conducting. This causes a charge to build up in one direction on capacitor 4 and causes saturable reactor 5 to saturate. Consequently, capacitance 4 abruptly discharges through rectifier 9 and the saturable reactor 5 by means of transformer 16. On the following half-cycle, the reverse occurs with the branch circuit including rectifier 10 and saturable reactor 7 being conductive while the branch circuit including rectifier 9 and saturable reactor 5 is non-conducting, which allows the initial flux in the core of saturable reactor 5 to be reset by the control current in control winding 11. This cycle is repetitive as was the case in FIGURE 1. It should be noted that the capacitance 4 may be connected across the end terminals of secondary winding 18 instead of across primary winding 17 of transformer 16. Since the load winding 15 is across secondary winding 18 instead of in the center-tap connection lead as in prior amplifiers, this amplifier is relatively insensitive to load changes. The output voltage across load 15 is also very insensitive to considerable changes in input voltage across terminals 1 and 2 due to the fact that the output voltage is fixed by the amount of flux swing within saturable reactors 5 and 7 which is stabilized by the control current in control winding 11.

Figure 3:
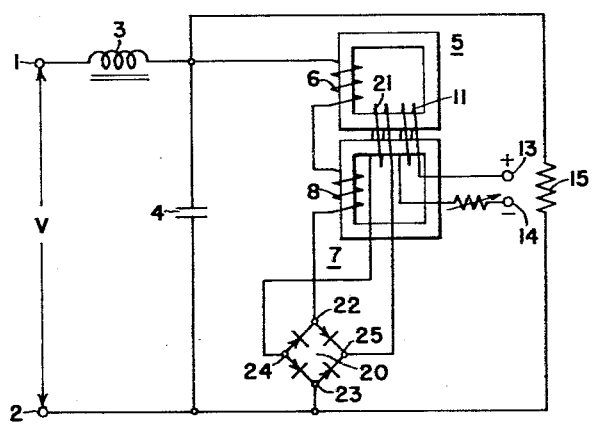
FIGURE 3 is a schematic diagram of a third embodiment of the new and improved magnetic amplifier used in this invention.

In FIGURE 3, a circuit is shown in which saturable reactors 5 and 7 are interconnected in a manner resembling the known self-saturated magnetic amplifier with external feedback. In this circuit, the A.-C. windings 6 and 8 of saturable reactors 5 and 7, respectively, are serially connected with a bridge rectifier 20 across capacitance 4. Terminals 22 and 23 of rectifier bridge 20 are utilized for this connection. A feedback winding 21 which is common to both saturable reactors 5 and 7 is connected to terminals 24 and 25 of rectifier bridge 20. Consequently, the rectifier bridge 20 delivers rectified current directly to the feedback winding 21. Again the load 15 is placed across capacitance 4. During a first half-cycle of the input voltage wave with a control current being applied to terminals 13 and 14 of control winding 11, the core of saturable reactor 5 is magnetized to saturation because the feedback current in winding 21 is aiding the current of saturable reactor 5 while it is opposed to that in saturable reactor 7. Consequently, there will be no flux change in saturable reactor 7. Again, when saturable reactor 5 becomes saturated, the charge which has built up on capacitor 4 is abruptly discharged. In the following half-cycle, the current in feedback winding 21 opposes that in winding 6 of saturable reactor 5, allowing the initial flux of saturable reactor 5 to be reset while aiding the current in winding 8 of saturable reactor 7, thus allowing a flux change within the core of saturable reactor 7. This cycle is repetitive as was the case in FIGURES 1 and 2. This circuit is likewise insensitive to variation in output voltage across load 15 due to large variations in input voltage V across terminals 1 and 2, and to changes in the value of load 15.

This new type of magnetically regulated voltage source which has been described in connection with FIGURES 1, 2 and 3 makes it possible to design a new type of magnetically regulated A.-C. or D.-C. power supply where only a portion of the supplied power has to be controlled. Savings of weight and reduction of internal losses can thus be realized with this new magnetically regulated power supply.

Figure 4:
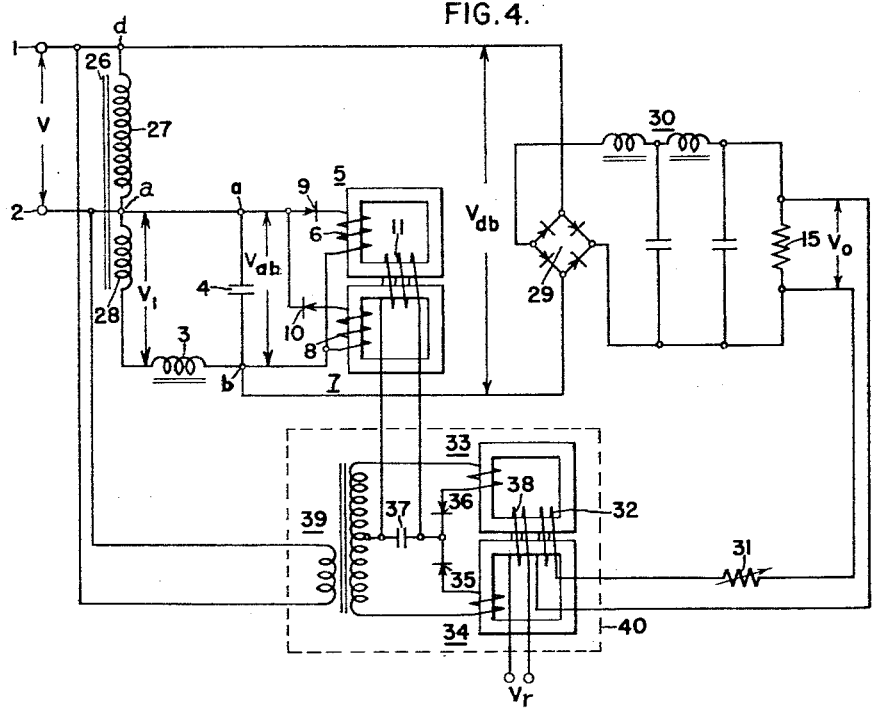
FIGURE 4 is a schematic diagram of a new and improved magnetic power supply in which the magnetic amplifier of FIGURE 1 is utilized to add a controlled alternating voltage to a relatively fixed alternating voltage.

FIGURE 4 shows one possible circuit configuration to illustrate the operating principles of this new power supply. It consists primarily of a conventional center-tap magnetic amplifier and driving a D.-C. controlled A.-C. voltage source such as that shown in FIGURE 1. The basic principle of operation of this power supply consists in connecting a magnetically controlled ferroresonant A.-C. voltage source in series with a primary power source to compensate for variations in voltage of the primary source as well as for variations in frequency, load and temperature. An auto transformer 26 is coupled to the primary source V by a winding 27 at terminals $d$ and $a$. The voltage $V_1$ across winding 28 of auto transformer 26, which is only a fraction of the main supply voltage V, is fed to the D.-C. controlled ferroresonant A.-C. voltage source which is the same circuit as that shown in FIGURE 1. It consists of linear choke 3, capacitance 4, saturable reactors 5 and 7, and rectifiers 9 and 10 as previously described in connection with FIGURE 1. Terminal $d$ of winding 27 of auto transformer 26 and terminal $b$ of capacitance 4 are connected across a rectifier bridge 29. A conventional filter 30 is connected across the other terminals of rectifier bridge 29 and a load device represented by resistance 15 is connected across filter 30. A conventional center-tap magnetic amplifier 40, hereinafter referred to as a preamplifier 40, consists of a saturable reactor pair 33 and 34, rectifiers 35 and 36, capacitance 37, transformer 39, control winding 32, and bias winding 38. The primary winding of transformer 39 is connected across the primary voltage source V. Bias winding 38 has its terminals connected to a magnetic reference voltage $V_r$ which is practically independent of voltage, frequency and temperature variations. Any other type of reference could be used which would furnish a constant reference voltage or current source. Preamplifier 40 performs the function of comparing the output voltage $V_o$ of the power supply against a reference voltage $V_r$ to derive and feed a control signal to the control winding 11 of the D.-C. controlled ferroresonant source. This is accomplished by feeding the output voltage of the power supply $V_o$ appearing across load 15 to the control winding 32 of preamplifier 40. A resistance 31 is connected in circuit with control winding 32 to serve as a variable adjustment for the desired value of output voltage $V_o$. The voltage across winding 32 is compared with a magnetic reference voltage $V_r$ across winding 38 of the preamplifier 40, the two windings being connected in opposition. From this comparison, a net controlled ampere-turn results, which is common to saturable reactors 33 and 34, thus providing for the desired flux change within the cores of the reactor pair 33 and 34. By magnetic amplifier operation, an output signal appears across capacitor 37. This signal is fed to control winding 11 of the reactor pair 5 and 7. This controlled signal controls the voltage $V_{ab}$ across capacitance 4 as has been described with reference to FIGURE 1. The controlled voltage $V_{ab}$ across terminals $a$ and $b$ is serially connected to the voltage $V_{da}$ across winding 27 of auto transformer 26 so that the voltage $V_{db}$ across the A.-C. terminals of bridge rectifier 29 is equal to the geometric sum of these two voltages. There is always a certain small phase shift between voltage $V_{da}$ and voltage $V_{ab}$. Briefly summarizing the circuit operation, the preamplifier 40 compares the rectified and filtered output voltage $V_o$ across the load resistance 15 with a reference voltage $V_r$, and acts on the ferroresonant regulator in such a manner that its output voltage $V_{ab}$ changes to maintain the voltage $V_o$ always constant and independent of changes in supply voltage, frequency, load and temperature.

Figure 5:
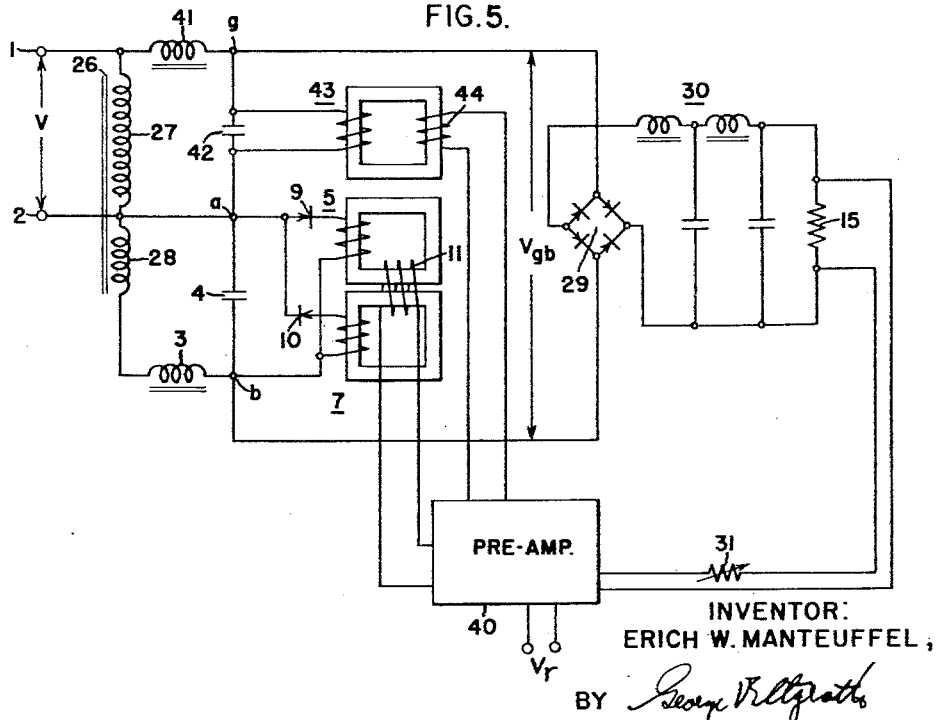
FIGURE 5 is a schematic diagram of another embodiment of the new and improved magnetic power supply which utilizes the magnetic amplifier shown in FIGURE 1.

The power supply described in FIGURE 4 can be improved considerably by employing the modifications shown in FIGURE 5. In this circuit a magnetic voltage stabilizer consisting of a linear choke coil 41, capacitor 42 and saturable reactor 43 is utilized to deliver a substantially constant output voltage which is relatively independent of variations in supply voltage. This stabilizer is shown and described in detail in the applicant's co-pending application entitled, "Temperature Compensated Voltage Stabilizer," Serial No. 519,180, filed June 30, 1955. The linear choke coil 41 and capacitor 42 are serially connected across winding 27 of auto transformer 26 which is coupled to the input source voltage. Saturable reactor 43 is connected across the terminals of capacitor 42. A secondary winding 44 is provided on saturable reactor 43 to provide a supply voltage for preamplifier 40 in order to eliminate possible influences of variations in input voltage on the characteristic operation of preamplifier 40. The remaining circuit connections are the same as in the case of FIGURE 4. The D.-C. controlled ferroresonant A.-C. voltage source consisting of linear choke 3, capacitor 4, saturable reactors 5 and 7, and rectifiers 9 and 10 is connected across winding 28 of auto transformer 26 in the same way as shown in FIGURE 4. Preamplifier 40 feeds a control signal to control winding 11 of the saturable reactor pair 5 and 7, the magnitude of which is determined in preamplifier 40 by comparing the output voltage $V_o$ across load 15 to a reference voltage $V_r$. The control signal in winding 11 in turn controls the output across capacitance 4. The output $V_{ab}$ across capacitance 4 is added to the output $V_{ga}$ across capacitance 42 such that their geometric sum $V_{gb}$ is applied to the A.-C. terminals of rectifier bridge 29. Since the output from the magnetic voltage stabilizer is inherently constant and relatively insensitive to large excursions of input voltage as explained in applicant's aforesaid co-pending application, the regulating portion of the supply source which is furnished by the D.-C. controlled ferroresonant A.-C. source can be kept as small as absolutely necessary, since it is only required to compensate for frequency, temperature and load variations. This reduces the size and weight of the ferroresonant source necessary to provide the desired compensation. The D.-C. controlled ferroresonant A.-C. source not only compensates for changes in output voltage due to variations in load, temperature, frequency, variations in supply voltage, but also acts as a booster amplifier which increases the minimum output of the power supply. In the booster amplifier, both cores of saturable reactors 5 and 7 are continuously saturated in the absence of any control current in control winding 11. Consequently, minimum output is achieved at a zero control current. Maximum output of the booster amplifier occurs when the control current is large enough to reset the cores to saturation in the opposite direction. The booster amplifier transfer characteristics have a slope opposite to that of a standard magnetic amplifier. Consequently, the output of the booster amplifier can be added directly to that of the magnetic voltage stabilizer to yield a greater minimum voltage without affecting the slope or linearity of the booster characteristic. Since the output voltages of both the magnetic voltage stabilizer and the booster amplifier are rectangular in form, and since the booster amplifier does not greatly affect the wave shape of the supply voltage as is common with known magnetic amplifiers, filtering is rendered less difficult to provide a smooth direct current output.

Thus, the circuitry shown in FIGURE 5 possesses a tremendous advantage over the existing power supplies since it eliminates practically all of the influences from transients of the supply voltage on the output voltage of the power supply. Frequency and temperature are not subject to sudden transients as the supply voltage might be and these variations are well-controlled by magnetic amplifiers in spite of their inherent response time. Influences of sudden changes in load are also greatly reduced due to the insensitive nature of magnetic stabilizers against such variations.

Figure 6:
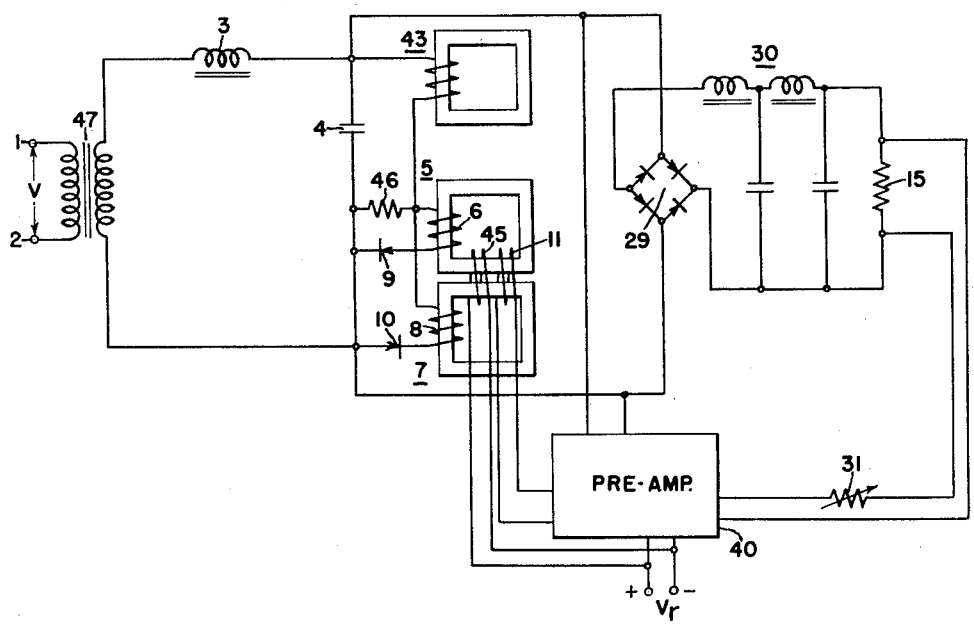
FIGURE 6 is a schematic diagram of a simplified version of the magnetic power supply shown in FIGURE 5.

In FIGURE 6 the circuit of FIGURE 5 is simplified without minimizing the advantages previously obtained. Linear choke 3 and capacitance 4 are serially coupled across a secondary winding of a transformer 47 whose primary winding is coupled to the input voltage V. Saturable reactor 43 is connected directly in series with network comprising the shunt connected pair of branches, made up respectively of winding 6 and rectifier 9 and of winding 7 and rectifier 10. Capacitance 4 is connected in parallel to the terminals of this series connection. By this connection, the voltage across the terminals of capacitor 4 is still changeable by a D.-C. control current through control winding 11 of reactor pair 5 and 7, but only a single capacitor and choke coil are necessary. The winding of saturable core 43 is serially connected to windings 6 and 8 of saturable reactors 5 and 7, respectively, with the windings 6 and 8 and rectifiers 9 and 10 being associated in the doubler connection shown in FIGURE 1. In this circuit, saturable reactors 5 and 7 are provided with a bias winding 45 which is coupled to the magnetic reference voltage $V_r$. Also, a resistance 46 is connected in parallel to the branch circuits including windings 6 and 8 of saturable reactors 5 and 7. As previously shown, the A.-C. terminals of rectifier bridge 29 are coupled across the terminals of capacitance 4. A filter 30 and load 15 follow rectifier bridge 29. The output voltage for preamplifier 40 is provided by a connection across the terminals of capacitance 4.

Since the saturable reactor 43 may require a larger magnetizing current than the pair of reactors 5 and 7, a resistance may be connected in parallel to the reactor which has the smallest magnetizing current in order to obtain proper phase coincidence in saturation. FIGURE 6 shows the resistance 46 connected in parallel with saturable reactors 5 and 7 indicating that the saturable reactors 5 and 7 have a smaller magnetizing current than saturable reactor 43. Such a resistance could be connected parallel with saturable reactor 43 should reactor 43 have a smaller magnetizing current than saturable reactors 5 and 7.

By taking the supply voltage for preamplifier 40 from the terminals of capacitance 4, the input voltage of preamplifier 40 is less dependent on voltage and frequency changes in the main power source. The resistance 31 which is connected in the signal circuit from load 15 serves to adjust the desired output voltage $V_o$ of the power supply. Bias winding 45, which is wound on reactor pair 5 and 7 and connected to the reference source voltage $V_r$, produces fixed ampere turns on the reactor pair 5 and 7, bucking the controlled ampere turns delivered from the preamplifier 40. It thus determines the mean operating point on the transfer characteristic of preamplifier 40. A variable resistance may be included in this circuit for control purposes.

The voltage across the terminals of the winding of saturable reactor 43 is constant and is determined by the saturation flux density of the magnetic material of this reactor. Voltage across the booster amplifier will be changeable and controlled by preamplifier 40 which receives its signals from the load voltage $V_o$ and a reference voltage $V_r$ as described in connection with FIGURES 4 and 5. The voltage across capacitor 4 is the algebraic sum of these two voltages, since this voltage is determined by the total flux swing within reactor 43 and reactors 5 and 7. Preamplifier 40 controls the reactor pair 5 and 7 through their control winding 11 such that the load voltage $V_o$ remains substantially constant regardless of variations in input voltage, load, frequency and temperature. The use of main input transformer 47 eliminates a galvanic connection between the D.-C. output terminals of the power supply and the A.-C. input terminals.

Figure 7:
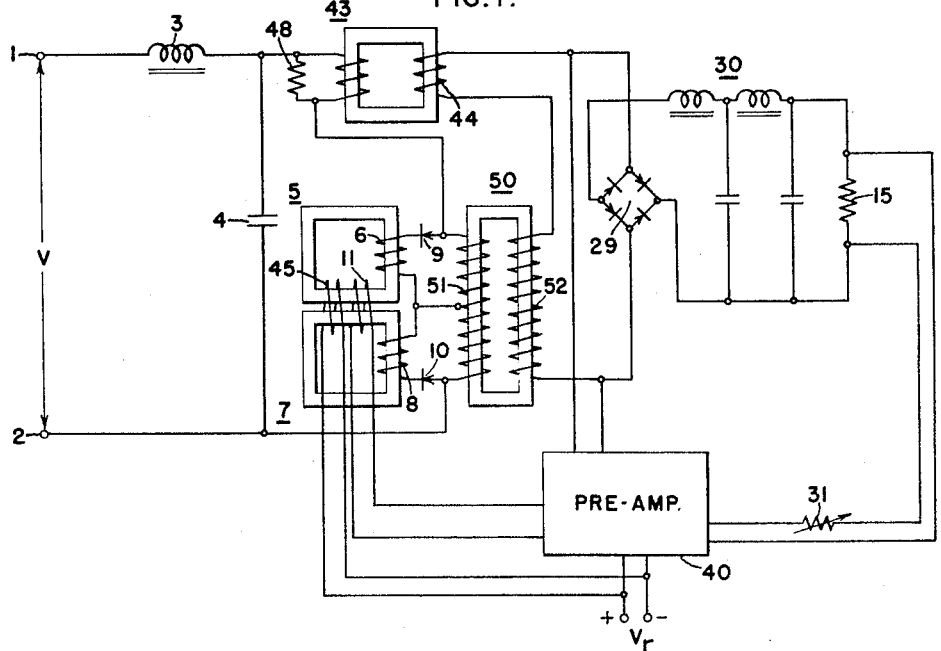
FIGURE 7 is a schematic diagram of a new and improved magnetic power supply of this invention which utilizes the magnetic amplifier shown in FIGURE 2.

Another version of the basic idea of the new and improved magnetic power supplies of this invention is shown in FIGURE 7. This circuits differs from FIGURE 6 in that the winding of saturable reactor 43 is connected in series to the input winding 51 of an auxiliary transformer 50. Winding 51 of transformer 50 is connected to windings 6 and 8 of reactor pair 5 and 7, respectively, and rectifiers 9 and 10 in a center-tap connection in the same manner as shown in FIGURE 2. Secondary winding 44 on saturable reactor 43 is serially connected with secondary winding 52 of transformer 50. This circuit is connected across the A.-C. terminals of rectifier bridge 29. The input supply voltage for preamplifier 40 is taken across serially connected windings 44 and 52 in order to provide an input voltage for the preamplifier 40 which is less dependent on voltage and frequency changes of the main power source. A resistance 48 is shown connected across the winding of saturable reactor 43 indicating that saturable reactor 43 has a smaller magnetizing current than the reactor pair 5 and 7.

In the circuit of FIGURE 7, the voltage across the winding 44 remains substantially constant while the voltage across the winding 52 is changeable and depends on the controlled swing of flux in reactor pair 5 and 7, which in turn is controlled by preamplifier 40 in a manner previously described.

Many advantages of the new and novel power supply embodied in this invention have already been set forth. Only a small amount of power is dissipated for compensation purposes. The power supplies are safe against short-circuits occurring at their output terminals due to the current limiting action of a choke coil 3 which is provided in series with the input from the source, eliminating possible damage to the components of the supply. These supplies have the further advantage of having little effect on the voltage wave shape of the supplying generator. This is due to the fact that the supplying generator is not subjected to abrupt changes in impedances associated with conventional magnetic amplifiers at the point of firing. The regulating portion of the power supply furnished by the booster amplifier can be kept as small as possible, consequently reducing size and weight requirements. This is possible in the circuits of FIGURES 5, 6 and 7, since it is only necessary in these circuits to compensate for frequency, temperature and load variations, and frequency and temperature are not subjected to sudden transients as the supply voltage might be. Also, since the output voltage wave shape of stabilizers of the ferro-resonant kind approach in general a rectangular form, filtering of the rectified voltage is rendered easier. Then too, due to the fact that only a small portion of the output is dissipated for compensation purposes, the power factor and efficiency are improved considerably.

As will appear obvious to those skilled in the art, the core members shown in the drawings may be varied in size and shape. Where a pair of reactors are used, the core member may even be a unitary structure, having a control winding wound on a common central leg portion. It is desirable, however, that the core material for the saturable reactors utilized in this invention have a substantially rectangular magnetization characteristic.

No stabilizing means in order to prevent hunting are shown in FIGURES 4, 5, 6 and 7 since a variety of means for damping purposes is known to those skilled in the art of magnetic regulating systems.

Since other modifications varied to fit particularly operating requirements and environments will be apparent to those skilled in the art, the invention is not considered limited to the examples chosen for purposes of disclosure and covers all changes and modifications which do not constitute departures from the true spirit and scope of this invention.

What I claim as new and desire to secure by Letters Patent of the United States is:

1. In a magnetic network, input terminals for connection to an alternating current source, an inductance, a capacitance serially coupled with said inductance between said input terminals, at least one saturable core element having a control winding and a controlled winding and at least one unidirectional conducting device connected in circuit with the controlled winding of said saturable core element, and means for coupling the circuit formed by said controlled winding and said unidirectional device across said capacitance and load.

2. In a magnetic amplifier, input terminals for connection to an alternating current source, an inductance, a capacitance, means for coupling said capacitance in series with said inductance between said input terminals, a pair of magnetically controlled saturable reactor elements each having an alternating current winding, at least one rectifying element in circuit with said alternating current windings of said saturable reactor elements to provide unidirectional current flows therein, means for coupling the circuit formed by said saturable reactor elements and said rectifying element across said capacitance, and load means connected across said capacitance.

3. In a network, input terminals for connection to an alternating current source, an inductance, a capacitance serially coupled with said inductance between said input terminals, a pair of saturable reactors each having an alternating current winding, at least two rectifying elements connected in circuit with said alternating current windings of said saturable reactors to provide unidirectional current flow in each of said saturable reactors, a control winding coupled with said saturable reactors, and means coupling said circuit of rectifying elements and saturable reactors across said capacitance.

4. In a magnetic network, a pair of saturable reactors each having an alternating current winding, a control winding coupled with said reactor pair for magnetically controlling the output of said reactors, a rectifying element electrically connected in circuit with each of said alternating current windings of said saturable reactors to provide unidirectional current flow in each of said saturable reactors, input terminals for connection to an alternating current source, a serially connected inductance and capacitance connected between said input terminals, means for coupling the circuit including said rectifying elements and said saturable reactors across said capacitance, and load means connected across said capacitance.

5. In a magnetic network, first and second saturable core elements each having a controlled winding and having a common control winding, input terminals for connection to an alternating current source, an inductance, a capacitance connected in series with said inductance between said input terminals, a first unidirectional conducting device, means for connecting one terminal of the controlled winding of said first saturable reactor through said unidirectional conducting device to one terminal of said capacitor, a second unidirectional conducting device, means for connecting one terminal of the controlled winding of said second saturable core element through said second unidirectional conducting device to the said one terminal of said capacitor, means connecting the other terminal of the controlled winding of said first and second saturable core elements to the other terminal of said capacitor, and load means connected across said capacitor.

6. In a magnetic network, first and second magnetic core members having a common control winding thereon and each having a controlled winding thereon, a transformer having primary and center-tapped secondary windings thereon, a pair of unidirectional conducting devices each having one terminal coupled to one terminal of said controlled windings respectively, means coupling the series circuits formed respectively by one unidirectional conducting device and one controlled winding across the respective halves of said center tapped secondary winding, an inductance and a serially connected capacitance, said capacitance being connected across the primary terminals of said transformer, and load means connected across the end terminals of the secondary winding of said transformer.

7. In a magnetic amplifier, first and second magnetic core members having a common control winding associated therewith and each having a controlled winding thereon, an auxiliary winding associated with said first and second magnetic core members, a rectifier bridge, means connecting said auxiliary winding across two terminals of said rectifier bridge, a capacitance, means connecting said controlled winding and the two terminals of said rectifier bridge across said capacitance, an inductance serially connected to said capacitance, and load means connected across said capacitance.

8. In a circuit having an alternating current source, circuit means coupled to said source for converting a portion of the energy from said source to direct current, a magnetic amplifier coupled to said source for magnetically controlling a relatively small portion of the energy of said source, said magnetic amplifier being coupled to said circuit means whereby a relatively small controlled voltage is added to a relatively large voltage, output circuit means coupled to said first named circuit means and to said magnetic amplifier, means coupled to said output circuit means for detecting variations in output voltage from a predetermined value, and means for feeding these variations to said magnetic amplifier to effectively maintain a substantially constant output voltage across said output circuit means.

9. In a circuit adapted for use with an input source of alternating current, unidirectional conducting means provided with connections for said source, filter means connected to said unidirectional conducting means, load means connected to said filter means, at least one saturable core element having a control winding and a controlled winding, at least one unidirectional conducting device connected in a branch circuit with the controlled winding of the saturable core element, a serially connected inductance and a capacitance coupled to said input source, means for coupling said branch circuit and said unidirectional conducting means across said capacitance, means for detecting variations in voltage across said load means, means for deriving a control signal representative of the variation in load voltage and feeding said control signal to the control winding of said saturable core element whereby magnetic compensation is provided for changes in load voltage.

10. In a circuit adapted for alternating current input, means connected to said input for providing a primary voltage which comprises a substantial portion of said alternating current input, a magnetic control means connected to said input for providing a controlled alternating voltage which is relatively smaller than said first portion of said alternating current input, output means excited by said voltages, means for deriving a control signal from said output means which represents a deviation in the output voltage from a reference value, and means for coupling said control signal to said magnetic control means to provide compensation for changes in output voltage while utilizing only a small portion of the input power to provide such compensation.

11. In a circuit adapted for connection to an alternating current source, a magnetic device having at least one core of magnetic material, a control winding thereon, a pair of controlled windings thereon connected to branch circuits, separate oppositely poled unidirectional conducting devices connected in each of said branch circuits, a serially connected inductance and capacitance, means for connecting said branch circuits across said capacitance, means for coupling said magnetic device to said alternating current source whereby a relatively small portion of said source is applied to said magnetic amplifier, means coupled to said source for providing an alternating voltage which comprises a substantial portion of said source, rectifying and filtering means coupled to said last named means and across the capacitance of said magnetic device, load means connected across said filtering means, means associated with said load means for deriving a control signal whose magnitude is dependent on a variation from a predetermined value of load voltage, means for feeding said control signal to the control winding of said magnetic amplifier to provide compensation for variations in load voltage from a predetermined value.

12. In a circuit adapted for connection with an alternating input source, a magnetic device coupled to said source for magnetically controlling a portion of said source having a pair of saturable reactors with a common control winding thereon, said pair of saturable reactors including a pair of alternating current windings, a branched circuit including a pair of unidirectional conducting devices and said pair of alternating current windings of said saturable reactors, a serially connected inductance and capacitance coupled to said source, means for coupling said branched circuit across said capacitance, means coupled to said source for obtaining a substantial portion of said source, means for combining the output of said magnetic device and said last named means, means for converting said combined outputs to a unidirectional voltage, load means coupled with said last mentioned means, means coupled to said load means for providing a control signal which is dependent on variations in voltage across the load from a predetermined amount, and means for feeding said control signal to the control winding of said magnetic amplifier to magnetically compensate for changes in voltage across the load means.

13. In a magnetic power supply adapted for connection with an alternating current input, a main voltage stabilizer circuit coupled to said source for providing a relatively fixed alternating voltage which comprises a substantial portion of said source voltage, a magnetic device coupled to said source for providing a controlled alternating voltage which comprises a relatively small portion of said source voltage, means for combining the outputs of said voltage stabilizer and said magnetic device, means for converting said combined outputs to a unidirectional voltage, means for detecting variations in said output voltage from a predetermined amount, means for coupling the detected variation in said output voltage to said magnetic amplifier for magnetically compensating for said variations in output voltage to maintain a substantially constant output.

14. In a circuit adapted for connection with an alternating current input, a voltage stabilizer comprising a serially connected inductance and capacitance and a saturable reactor being connected in parallel with said capacitance; a magnetic device having a pair of saturable reactors with a common control winding, a pair of branch circuits each having a unilateral conducting device and one of said two last recited saturable reactors therein, a serially connected second inductance and a second capacitance, said branch circuits being connected aross said last named capacitance; means connecting said voltage stabilizer and said magnetic device to said alternating current input, means for serially combining the alternating voltage outputs of said voltage stabilizer and said magnetic device, means for converting the alternating voltage outputs to a unidirectional voltage, preamplifier means associated with said unidirectional output voltage for deriving a control signal from said output voltage based on a predetermined value of output voltage, means coupling said control signal to the control winding of said magnetic amplifier for varying the alternating output voltage of said magnetic amplifier, thereby compensating said circuit for variations in unidirectional output voltage from a predetermined level.

15. In a circuit adapted for connection with an alternating current input source, an inductance and a capacitance serially connected across said source, first, second and third saturable reactors, each of said saturable reactors having an alternating current winding, said second and third saturable reactors having a common control winding thereon, means connecting one terminal of said alternating current winding of said first saturable reactor to one pole of said capacitance, separate unidirectional conducting devices being connected in series with each of said alternating current windings of said second and third saturable reactors respectively, the series circuits so formed being connected between the other terminal of said alternating current winding of said first saturable reactor and the other pole of said capacitance, rectifying means connected across said capacitance, a load means connected to said rectifying means, preamplifier means connected between the common control winding of said second and third saturable reactors and said load for feeding a control signal to said common control winding whose magnitude depends on a variation in load voltage from a predetermined amount.

16. In a circuit adapted for connection with an alternating current source input, an inductance and a capacitance serially connected across said source, a magnetic device comprising a pair of saturable reactors with a common control winding thereon, a pair of branch circuits each including one of said saturable reactors and a unidirectional conducting device, a transformer having a center-tapped primary winding, said branch circuits being connected to the respective halves of said primary winding, another saturable reactor, means serially connecting said last mentioned saturable reactor and said center-tapped primary winding across said capacitance, means for combining the outputs of said last named saturable reactor and said magnetic device, rectifying and load means associated with said output, preamplifier means associated with said load means to provide and feed a control signal to the control winding of said magnetic amplifier, the magnitude of said control signal depending on a variation in output across said load from a predetermined value.

17. In a magnetic network, a source of alternating voltage, an inductance and a capacitance serially coupled to said alternating source, at least one saturable reactor having a gate winding and a control winding and at least one unidirectional conducting device connected in series with said gate winding, and means for coupling said series circuit including said unidirectional conducting device and said gate winding across said capacitance, the parallel resonant frequency of said capacitance and saturated inductance of said saturable reactor is at least one order of magnitude higher than the frequency of said source of alternating voltage.

References Cited in the file of this patent

UNITED STATES PATENTS

| | | |
|---|---|---|
| 1,997,657 | Schmutz | Apr. 16, 1935 |
| 2,473,592 | Klemperer | June 21, 1949 |
| 2,653,293 | Huge | Sept. 22, 1953 |
| 2,675,515 | Blashfield | Apr. 13, 1954 |
| 2,725,521 | Geyger | Nov. 29, 1955 |
| 2,739,282 | Evans | Mar. 30, 1956 |
| 2,807,775 | Schmidt | Sept. 24, 1957 |